(12) United States Patent
Takemura et al.

(10) Patent No.: US 9,638,557 B2
(45) Date of Patent: May 2, 2017

(54) ULTRASONIC FLOWMETER HAVING AN ARITHMETIC OPERATION UNIT FOR CALCULATING PROPAGATION TIME CORRECTION VALUE

(71) Applicant: Panasonic Intellectual Property Management Co., Ltd., Osaka-shi, Osaka (JP)

(72) Inventors: Kouichi Takemura, Nara (JP); Yuji Fujii, Nara (JP); Yasuo Koba, Nara (JP); Aoi Watanabe, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 82 days.

(21) Appl. No.: 14/438,547

(22) PCT Filed: Oct. 29, 2013

(86) PCT No.: PCT/JP2013/006383
§ 371 (c)(1),
(2) Date: Apr. 24, 2015

(87) PCT Pub. No.: WO2014/068952
PCT Pub. Date: May 8, 2014

(65) Prior Publication Data
US 2015/0292926 A1    Oct. 15, 2015

(30) Foreign Application Priority Data

Nov. 5, 2012  (JP) ................................ 2012-243342

(51) Int. Cl.
*G01F 1/66*   (2006.01)
*G01F 15/02*  (2006.01)
*G01F 25/00*  (2006.01)

(52) U.S. Cl.
CPC ................ *G01F 1/66* (2013.01); *G01F 1/662* (2013.01); *G01F 15/022* (2013.01);
(Continued)

(58) Field of Classification Search
None
See application file for complete search history.

(56) References Cited

U.S. PATENT DOCUMENTS 4,557,148 A  * 12/1985 Akiyama ................ G01F 1/667
                                                 702/48
5,831,175 A     11/1998 Fletcher-Haynes
(Continued)

FOREIGN PATENT DOCUMENTS

JP      2004-72912 A     3/2004
JP      2004-77446 A     3/2004
(Continued)

OTHER PUBLICATIONS

International Search Report, and English language translation thereof, in corresponding International Application No. PCT/JP2013/006383, dated Nov. 26, 2013, 5 pages.
(Continued)

*Primary Examiner* — Harshad R Patel
(74) *Attorney, Agent, or Firm* — Brinks Gilson & Lione (57) ABSTRACT

A flow meter device includes: a first vibrator, a second vibrator, a control unit, a timekeeper, and an arithmetic operation unit. The arithmetic operation unit is configured to: determine whether or not a time difference between a propagation time in the forward direction and a propagation time in the reverse direction is less than a predetermined value; calculate a propagation time correction amount based on the time difference if it is determined that the time
(Continued)

difference is less than the predetermined value; and calculate a flow rate of the fluid by using the propagation time correction amount.

4 Claims, 7 Drawing Sheets

(52) U.S. Cl.
CPC ........ *G01F 15/024* (2013.01); *G01F 25/0007* (2013.01); *G01F 1/667* (2013.01)

(56) References Cited

U.S. PATENT DOCUMENTS

| | | | |
|---|---|---|---|
| 8,903,663 B2* | 12/2014 | Shiba | G01F 1/667 702/48 |
| 2012/0185183 A1 | 7/2012 | Takemura et al. | |
| 2012/0272748 A1* | 11/2012 | Watanabe | G01F 1/667 73/861.18 |

FOREIGN PATENT DOCUMENTS

| | | |
|---|---|---|
| JP | 2004-361190 A | 12/2004 |
| JP | 2007-64988 A | 3/2007 |
| WO | WO 2011/040027 A1 | 4/2011 |

OTHER PUBLICATIONS

Extended Search Report for corresponding European Application No. 13 85 1849.3 dated Dec. 4, 2015, 6 pages.

\* cited by examiner

PRIOR ART

ULTRASONIC FLOWMETER HAVING AN ARITHMETIC OPERATION UNIT FOR CALCULATING PROPAGATION TIME CORRECTION VALUE

This application is a 371 application of PCT/JP2013/006383 having an international filing date of Oct. 29, 2013, which claims priority to JP 2012-243342 filed Nov. 5, 2012, the entire contents of which are incorporated herein by reference.

TECHNICAL FIELD

The present invention relates to a flow meter device and a flow rate calculation method thereof. The present invention particularly relates to a flow meter device for measuring the flow rate of a fluid passing through a conduit based on a time over which an ultrasonic signal propagates between a pair of vibrators installed on the conduit, and to a flow rate calculation method of the flow meter device.

BACKGROUND ART

Conventionally, there are fluid measurement devices for measuring the flow rate of a fluid by utilizing a propagation time over which an ultrasonic signal propagates through a conduit. For example, one such known fluid measurement device is a flow meter device disclosed in Patent Literature 1.

Figure 7:
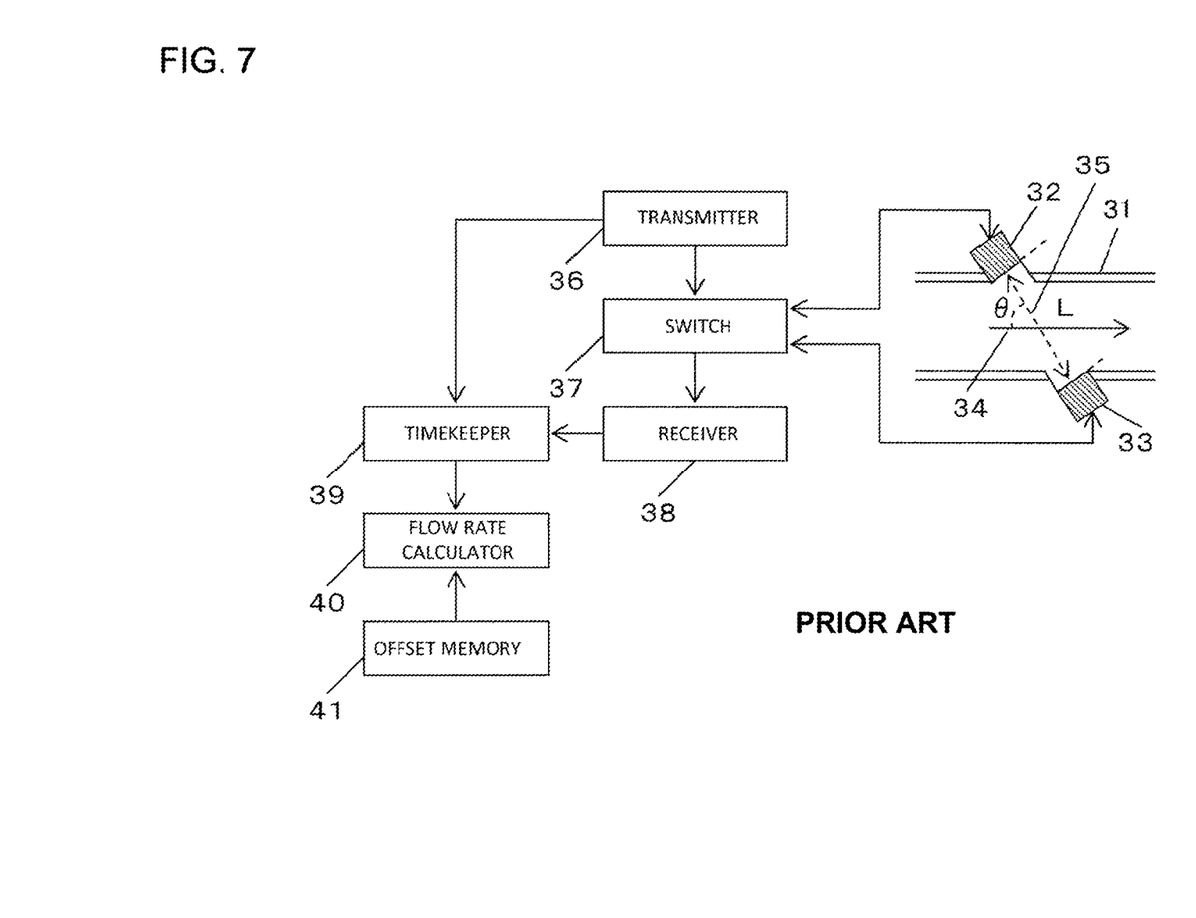
FIG. 7 is a functional block diagram showing the configuration of a conventional flow meter device.

As shown in FIG. 7, in the flow meter device, a first vibrator 32 and a second vibrator 33 are provided on a passage 31. A timekeeper 39 measures a time over which an ultrasonic signal propagates between the vibrators 32 and 33. A flow rate calculator 40 corrects the propagation time of the ultrasonic signal by using an offset value that is stored in advance in an offset memory 41, and calculates the flow rate of the fluid passing through the passage 31 based on the corrected propagation time.

Specifically, ideally, in a case where there is no flow of the fluid in the passage 31, the propagation time of the ultrasonic signal when the ultrasonic signal propagates in a forward direction from the vibrator 32 to the vibrator 33 coincides with the propagation time of the ultrasonic signal when the ultrasonic signal propagates in a reverse direction from the vibrator 33 to the vibrator 32. However, a difference between the propagation time in the forward direction and the propagation time in the reverse direction (i.e., an offset value) may occur due to, for example, characteristic differences between the vibrators 32 and 33. Therefore, by correcting the propagation time by using the offset value, a more precise flow rate can be obtained.

CITATION LIST

Patent Literature

PTL 1: Japanese Laid-Open Patent Application Publication No. 2007-64988

SUMMARY OF INVENTION

Technical Problem

The offset value in the flow meter device disclosed in Patent Literature 1 is measured in a state where there is no flow of the fluid in the passage 31. Accordingly, in general, the time for performing the offset value measurement is limited to when the factory settings of the flow meter device are made or when the flow meter device is installed at its installation site. Therefore, changes in the offset value due to, for example, aging of the flow meter device cannot be taken into consideration.

In the case of measuring the offset value after the flow meter device is installed at the installation site, it is necessary that, by means of a shut-off valve or the like, the passage 31 be rendered in a state where there is no flow of the fluid in the passage 31. In this case, however, inconveniences are caused. For example, while the passage 31 is in such a state, the use of the fluid is not allowed.

The present invention solves the above-described problems. An object of the present invention is to provide a flow meter device capable of suppressing a decrease in measurement precision for a long term without causing inconvenience, and to provide a flow rate calculation method of the flow meter device.

Solution to Problem

A flow meter device according to one aspect of the present invention is a flow meter device for measuring a flow rate of a fluid passing through a conduit, the flow meter device including: a first vibrator and a second vibrator, each of which is provided on the conduit and configured to transmit and receive an ultrasonic signal; a control unit configured to intermittently switch transmitting and receiving vibrators of the ultrasonic signal between the first vibrator and the second vibrator; a timekeeper configured to measure a propagation time of the ultrasonic signal in a forward direction from the first vibrator to the second vibrator, and measure a propagation time of the ultrasonic signal in a reverse direction from the second vibrator to the first vibrator; and an arithmetic operation unit configured to calculate the flow rate of the fluid based on the propagation times of the ultrasonic signal. The arithmetic operation unit is configured to: determine whether or not a time difference between the propagation time in the forward direction and the propagation time in the reverse direction is less than a predetermined value; calculate a propagation time correction amount based on the time difference if it is determined that the time difference is less than the predetermined value; and calculate the flow rate of the fluid by using the propagation time correction amount.

Advantageous Effects of Invention

The present invention is configured as described above, and has an advantage of being able to provide a flow meter device capable of suppressing a decrease in measurement precision for a long term without causing inconvenience, and to provide a flow rate calculation method of the flow meter device.

The above object, other objects, features, and advantages of the present invention will be made clear by the following detailed description of preferred embodiments with reference to the accompanying drawings.

DETAILED DESCRIPTION OF THE PREFERRED EMBODIMENTS

A flow meter device according to a first aspect of the present invention is a flow meter device for measuring a flow rate of a fluid passing through a conduit, the flow meter device including: a first vibrator and a second vibrator, each of which is provided on the conduit and configured to transmit and receive an ultrasonic signal; a control unit configured to intermittently switch transmitting and receiving vibrators of the ultrasonic signal between the first vibrator and the second vibrator; a timekeeper configured to measure a propagation time of the ultrasonic signal in a forward direction from the first vibrator to the second vibrator, and measure a propagation time of the ultrasonic signal in a reverse direction from the second vibrator to the first vibrator; and an arithmetic operation unit configured to calculate the flow rate of the fluid based on the propagation times of the ultrasonic signal. The arithmetic operation unit is configured to: determine whether or not a time difference between the propagation time in the forward direction and the propagation time in the reverse direction is less than a predetermined value; calculate a propagation time correction amount based on the time difference if it is determined that the time difference is less than the predetermined value; and calculate the flow rate of the fluid by using the propagation time correction amount.

A flow meter device according to a second aspect of the present invention may be configured such that the flow meter device according to the above first aspect further includes: a temperature detector configured to detect a temperature of the fluid; and a temperature zone determiner configured to determine, among predetermined temperature zones, a temperature zone to which the temperature of the fluid belongs. The arithmetic operation unit may be configured to calculate the propagation time correction amount for each of the temperature zones.

A flow meter device according to a third aspect of the present invention may be configured such that, in the above second aspect, conditions for calculating the propagation time correction amount are different for each temperature zone.

A flow rate calculation method according to a fourth aspect of the present invention is a flow rate calculation method of a flow meter device, the flow meter device including a first vibrator and a second vibrator, each of which is provided on a conduit and configured to transmit and receive an ultrasonic signal, the flow meter device measuring a flow rate of a fluid flowing through the conduit. The flow rate calculation method includes: intermittently switching transmitting and receiving vibrators of the ultrasonic signal between the first vibrator and the second vibrator; measuring a propagation time of the ultrasonic signal in a forward direction from the first vibrator to the second vibrator and a propagation time of the ultrasonic signal in a reverse direction from the second vibrator to the first vibrator; determining whether or not a time difference between the propagation time in the forward direction and the propagation time in the reverse direction is less than a predetermined value; calculating a propagation time correction amount based on the time difference if it is determined that the time difference is less than the predetermined value; and calculating the flow rate of the fluid by using the propagation time correction amount.

Hereinafter, a specific description of embodiments of the present invention is given with reference to the drawings. In the drawings, the same or corresponding elements are denoted by the same reference signs, and repeating the same descriptions is avoided below.

(Embodiment 1)
(Configuration of Flow Meter Device)

Figure 1:
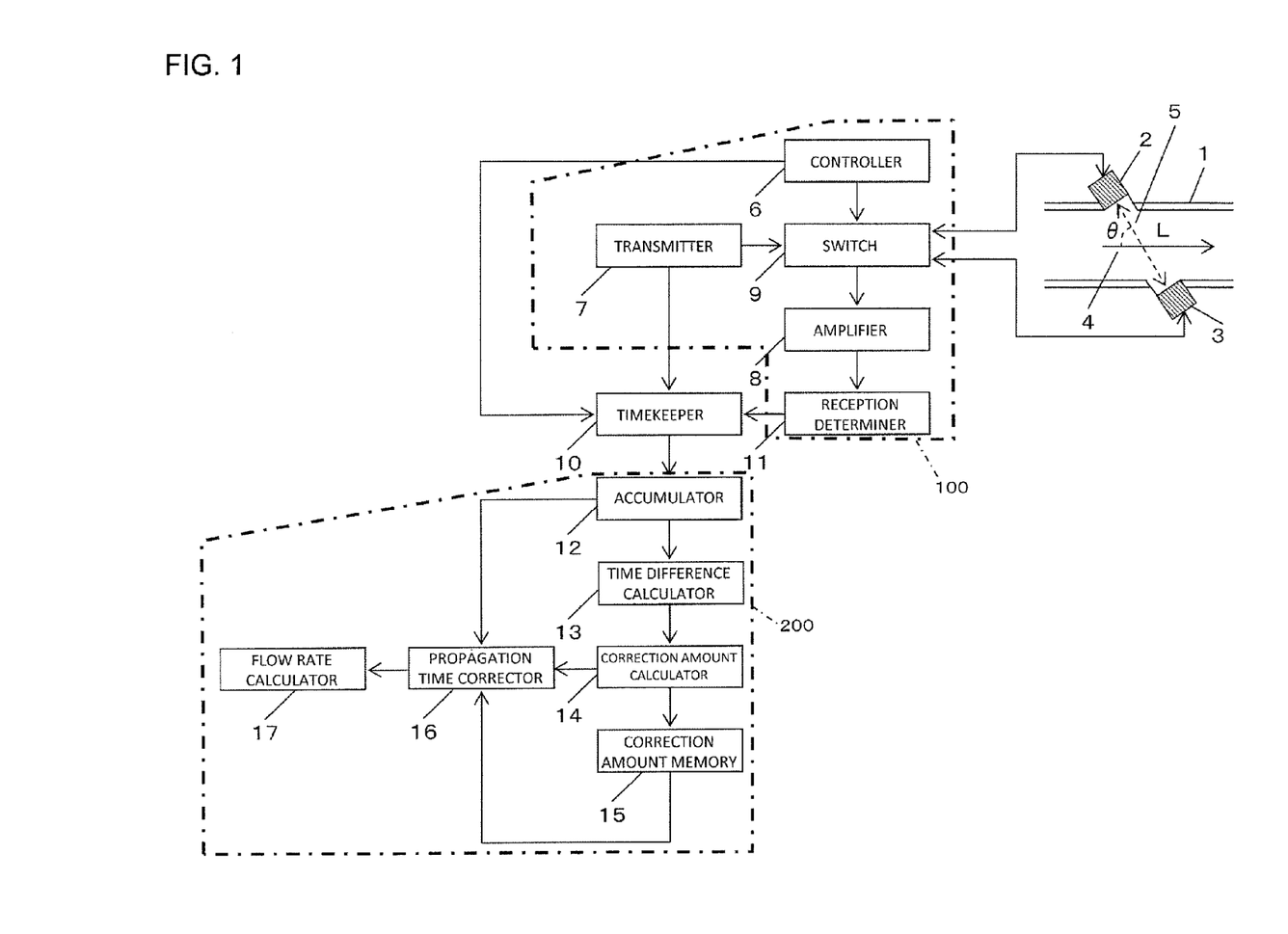
FIG. 1 is a functional block diagram showing the configuration of a flow meter device according to Embodiment 1 of the present invention.

FIG. 1 is a functional block diagram showing the configuration of a flow meter device according to Embodiment 1. Description below is a case where the flow meter device according to the present invention is applied to a gas meter that calculates the amount of use of gas supplied to a general household. However, the flow meter device is not limited to a gas meter.

As shown in FIG. 1, the flow meter device is provided on a conduit 1. The flow meter device is a meter device configured to measure the flow rate of a fluid flowing through the conduit 1. The flow meter device includes a first vibrator 2, a second vibrator 3, a control block 100, a timekeeper 10, and an arithmetic operation block 200. The control block 100, the timekeeper 10, and the arithmetic operation block 200 may be realized by any devices with arithmetic processing functions. Examples of the devices with arithmetic processing functions include an MPU and a logic circuit. It should be noted that the control block 100, the timekeeper 10, and the arithmetic operation block 200 may be realized by a single arithmetic processing device, or may be realized by a plurality of arithmetic processing devices operating in cooperation with each other.

The first vibrator 2 and the second vibrator 3 are ultrasonic transducers, each of which is configured to transmit and receive an ultrasonic signal. Each of the vibrators 2 and 3 is installed on the conduit 1. The first vibrator 2 is disposed upstream of the second vibrator 3. Emitting surfaces of the respective vibrators 2 and 3 face each other.

The control block 100 is a control unit controlling the transmission and reception of the ultrasonic signal by the vibrators 2 and 3. The control block 100 includes a controller 6, a transmitter 7, an amplifier 8, a switch 9, and a reception determiner 11. The switch 9 is connected to the vibrators 2 and 3 via signal lines, and intermittently switches transmitting and receiving vibrators of the ultrasonic signal between the first vibrator 2 and the second vibrator 3.

The timekeeper 10 may be realized by any device with a time-keeping function. One example of such a device is a clock circuit. The timekeeper 10 measures propagation times of the ultrasonic signal in accordance with a switch timing signal from the control block 100, a signal indicative of the rising edge of a drive signal, and a time-keeping stop timing signal. The propagation times to be measured by the timekeeper 10 include a propagation time in a forward direction and a propagation time in a reverse direction. The propagation time in the forward direction is a time over which the ultrasonic signal propagates from the first vibrator 2 to the second vibrator 3. The propagation time in the reverse direction is a time over which the ultrasonic signal propagates from the second vibrator 3 to the first vibrator 2.

The arithmetic operation block 200 is an arithmetic operation unit calculating the flow rate of the fluid based on the propagation times of the ultrasonic signal. The arithmetic operation block 200 includes an accumulator 12, a time difference calculator 13, a correction amount calculator 14, a correction amount memory 15, a propagation time corrector 16, and a flow rate calculator 17. These components 12 to 17 will be described in detail below when necessary.

(Operation of Flow Meter Device)

Figure 2:
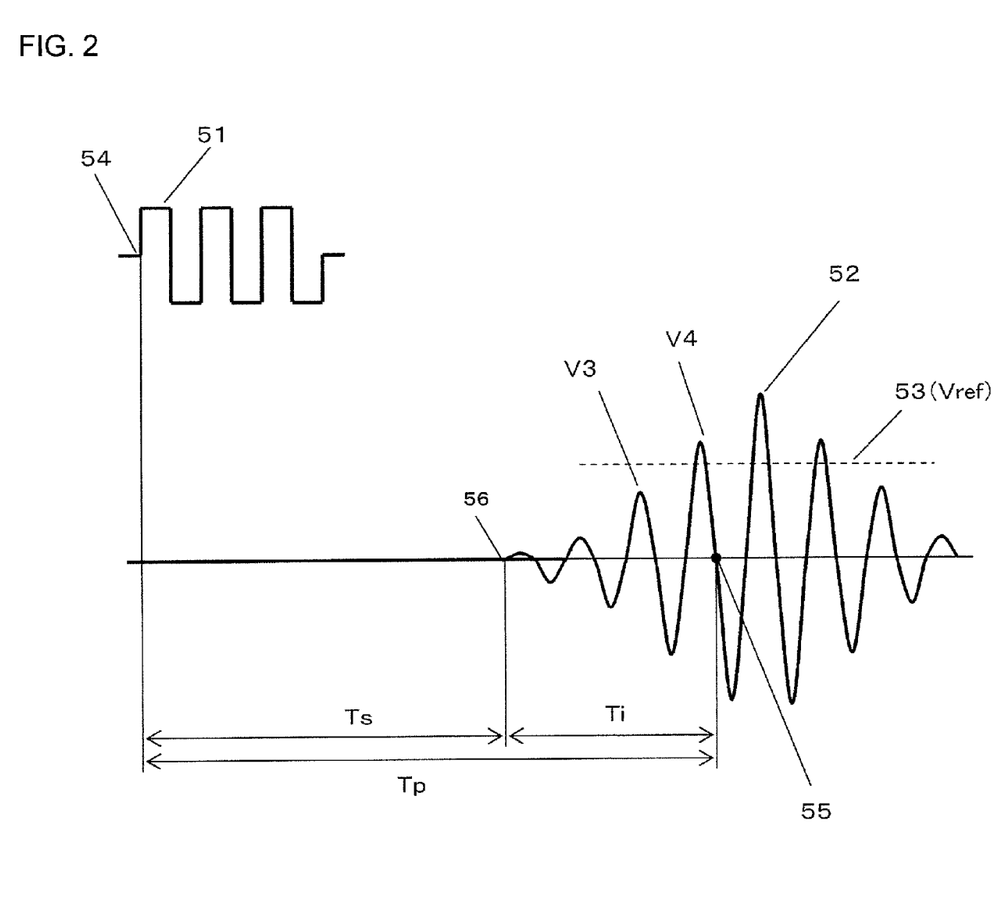
FIG. 2 shows wave form charts showing a drive signal and a reception signal in the flow meter device of FIG. 1.

The upper chart in FIG. 2 is a wave form chart showing a drive signal 51 for transmitting an ultrasonic signal from each of the vibrators 2 and 3. The lower chart in FIG. 2 is a wave form chart showing a reception signal 52 when each of the vibrators 2 and 3 has received the ultrasonic signal. In each chart, the horizontal axis represents time, and the vertical axis represents voltage. It should be noted that, in the description below, the reception determiner 11 is configured as a comparator. However, the reception determiner 11 is not limited to a comparator.

As shown in FIG. 1, the switch 9 connects the first vibrator 2 to the transmitter 7, and connects the second vibrator 3 to the amplifier 8. In this manner, the switch 9 makes settings such that the first vibrator 2 transmits an ultrasonic signal, and the second vibrator 3 receives the ultrasonic signal. In this case, the propagation direction of the ultrasonic signal is the forward direction, i.e., the ultrasonic signal propagates from the first vibrator 2 toward the second vibrator 3.

The fluid flows through the conduit 1 in a direction indicated by an arrow 4 (a solid-line arrow) in FIG. 1. Here, the transmitter 7 outputs a drive signal to the first vibrator 2 via the switch 9, and outputs a signal indicative of the rising edge of the drive signal to the timekeeper 10. The drive signal is the signal 51 with the waveform shown in the upper chart in FIG. 2. The timekeeper 10 starts keeping time from a rising timing 54 of the drive signal 51.

The first vibrator 2 transmits the ultrasonic signal in accordance with the drive signal 51. The ultrasonic signal propagates through the fluid in a direction indicated by an arrow 5 (a dashed-line arrow) in FIG. 1, and is received by the second vibrator 3. The second vibrator 3 outputs a reception signal in accordance with the ultrasonic signal. The reception signal is outputted to the amplifier 8 via the switch 9. After the reception signal is amplified by the amplifier 8, the reception signal is outputted to the reception determiner 11. The reception signal that has been amplified is the signal 52 with the waveform shown in the lower chart in FIG. 2.

In FIG. 2, a time Ts over which the ultrasonic signal has propagated between the first vibrator 2 and the second vibrator 3 is a time from the rising timing 54 to an arrival time point 56 of the reception signal 52. However, since the voltage of the reception signal 52 at the arrival time point 56 is small, it is difficult to distinguish the reception signal 52 from noise signals. Therefore, a threshold is set in order to precisely determine the reception signal 52.

Specifically, as indicated by a dashed line 53 in the lower chart in FIG. 2, the threshold is set to the voltage (Vref) of the comparator. The setting voltage 53 of the comparator is set, in advance, to a value at which erroneous operation of the comparator due to noise signals will not be caused. The value is, for example, the value of a voltage between the third-crest voltage (V3) and the fourth-crest voltage (V4) of the reception signal 52.

The reception determiner 11 performs a process of comparing the reception signal 52 and the setting voltage 53. As a result of the comparison, the reception determiner 11 outputs a time-keeping stop timing signal to the timekeeper 10 at the timing of a zero-crossing point 55. The zero-crossing point 55 is a time point at which the reception signal 52 reaches the zero point of the voltage immediately after exceeding the setting voltage 53 of the comparator.

The timekeeper 10 stops keeping time in accordance with the time-keeping stop timing signal. In this manner, a detection time Tp from the rising timing 54 of the drive signal 51 to the zero-crossing point 55 of the reception signal 52 is obtained. The zero-crossing point 55 is a time point at which a delay time Ti corresponding to 3.5 waves of the reception waveform has elapsed from the arrival time point 56. Accordingly, as shown in Equation 1 below, the propagation time Ts of the ultrasonic signal can be represented as a time that is obtained by subtracting the delay time Ti from the detection time Tp.

$$Ts = Tp - Ti \qquad \text{(Equation 1)}$$

The timekeeper 10 uses Equation 1 to measure a time T1 (propagation time in the forward direction), over which the ultrasonic signal has propagated from the first vibrator 2 to the second vibrator 3.

Next, the controller 6 outputs a switch timing signal to the switch 9. In accordance with the switch timing signal, the switch 9 connects the first vibrator 2 to the amplifier 8, and connects the second vibrator 3 to the transmitter 7. In this manner, settings are made such that the first vibrator 2 receives an ultrasonic signal, and the second vibrator 3 transmits the ultrasonic signal. In this case, the propagation direction of the ultrasonic signal is the reverse direction, i.e., the ultrasonic signal propagates from the second vibrator 3 toward the first vibrator 2.

The second vibrator 3 transmits the ultrasonic signal in accordance with a drive signal 51 from the transmitter 7. The timekeeper 10 starts keeping time from the rising timing 54 of the drive signal 51. Then, the first vibrator 2 receives the ultrasonic signal that has propagated through the fluid in the conduit 1, and outputs a reception signal 52 to the reception determiner 11 via the amplifier 8. The reception determiner 11 compares the reception signal 52 and the setting voltage 53, and outputs a time-keeping stop timing signal to the timekeeper 10 at the timing of the zero-crossing point 55. By using Equation 1, the timekeeper 10 measures a time T2 (propagation time in the reverse direction), over which the ultrasonic signal has propagated from the second vibrator 3 to the first vibrator 2.

The propagation time T1 in the forward direction is represented by Equation 2 shown below. The propagation time T2 in the reverse direction is represented by Equation 3 shown below. In each equation, the speed of sound is C; the flow velocity of the fluid is V; and the length of a propagation path between the first vibrator 2 and the second vibrator 3 is L. In FIG. 1, the propagation path is indicated by the dashed line 5, and the flow of the fluid in the conduit is indicated by the solid line 4. The crossing angle formed by the propagation path and the flow of the fluid in the conduit is θ.

$$T1 = L/(C + V \cos \theta) \qquad \text{(Equation 2)}$$

$$T2 = L/(C - V \cos \theta) \qquad \text{(Equation 3)}$$

By using Equation 2 and Equation 3, the velocity V of the fluid passing through the conduit 1 is represented by Equation 4 shown below.

$$V = (L/2\cos\theta)\cdot(1/T1 - 1/T2) \quad \text{(Equation 4)}$$

The flow rate Q per unit time of the fluid passing through the conduit 1 is represented by Equation 5 shown below. In Equation 5, the inner cross-sectional area of the conduit 1 is S. The flow rate Q of the fluid can be calculated from Equation 5 without depending on the speed of sound C.

$$Q = S\cdot V \quad \text{(Equation 5)}$$

In Equation 5, the inner cross-sectional area S of the conduit 1 is known. The velocity V of the fluid can be calculated from Equation 4. In Equation 4, the length L of the propagation path and the crossing angle θ are known, and each of the propagation times T1 and T2 is the propagation time Ts in Equation 1. According to Equation 1, the propagation time Ts is calculated based on the detection time Tp and the delay time Ti. The delay time Ti is a length of time corresponding to 3.5 waves of the reception signal 52. Accordingly, the flow rate calculator 17 can calculate the flow rate Q of the fluid based on the detection time Tp from the timekeeper 10 by using Equation 1, Equation 4, and Equation 5.

However, as shown in the lower chart in FIG. 2, the delay time Ti in Equation 1 is a time from the time point 56, at which the ultrasonic signal has reached the surface of the receiving-side vibrator 2 or 3, to the time point (zero-crossing point) 55, at which the reception determiner 11 determines that the ultrasonic signal has been received. Therefore, the delay time Ti varies depending on characteristic differences between the two vibrators 2 and 3. For example, due to the temperature characteristics and aging of the vibrators 2 and 3, the reception frequency or reception sensitivity of each of the vibrators 2 and 3 may change. In this case, a change in the delay time (Ti) occurs, accordingly. As a result, an error occurs in the propagation time Ts (T1, T2), which depends on the delay time Ti. This error causes an error in the flow rate Q of the fluid. Therefore, it is necessary to correct the flow rate Q of the fluid in order to improve the measurement precision. The flow meter device according to the present embodiment uses a difference between the propagation time T1 in the forward direction and the propagation time T2 in the reverse direction (i.e., a propagation time difference ΔT) when correcting the flow rate Q of the fluid.

(Propagation Time Difference ΔT)

Prior to giving a specific description of a method of correcting the flow rate Q of the fluid, the significance of calculating the propagation time difference ΔT is described below.

The first term (L/2 cos θ) in Equation 4 is a constant, which is determined by the shape of the flow meter device. Accordingly, the velocity V of the fluid is proportional to the second term (1/T1−1/T2) in Equation 4. The second term is expanded as shown below in Equation 6.

$$1/T1 - 1/T2 = (T2-T1)/(T1\cdot T2) \quad \text{(Equation 6)}$$

Next, the denominator of Equation 6 is expanded in such a manner that Equation 2 is substituted for T1 and Equation 3 is substituted for T2. The expansion is represented by Equation 7 shown below.

$$T1\cdot T2 = \{L/(C+V\cos\theta)\}\cdot\{L/(C-V\cos\theta)\} = L^2/(C^2-V^2\cos^2\theta) \quad \text{(Equation 7)}$$

In order to increase the measurement precision, the velocity V of the fluid is in general set to an extremely small value compared to the speed of sound C. Therefore, even if the denominator ($C^2-V^2\cos^2\theta$) of Equation 7 is approximate to $C^2$, it will not hinder the rough calculation of the flow rate Q of the fluid. Accordingly, based on Equation 7, T1·T2 can be represented by an approximate value $L^2/C^2$. The approximate value is substituted in Equation 6, and the propagation time difference (T2−T1) is represented by ΔT. Accordingly, the second term in Equation 4 can be represented by Equation 8 shown below.

$$1/T1 - 1/T2 = \Delta T\cdot(C^2/L^2) \quad \text{(Equation 8)}$$

Here, if the kind of the fluid is determined, the speed of sound C can be in general approximated by a linear expression of the temperature of the fluid. For example, if the kind of the fluid is air, the speed of sound C is represented by Equation 9 shown below. In Equation 9, t represents the temperature [° C.] of the fluid.

$$C = 0.6t + 331.5 \text{ [m/s]} \quad \text{(Equation 9)}$$

In Equation 9, if the kind and the temperature of the fluid are determined, the speed of sound C is constant. Accordingly, since the speed of sound C and the length L of the propagation path are constant in Equation 8, the second term in Equation 4 is proportional to the propagation time difference ΔT. Accordingly, the velocity V of the fluid in Equation 4 is proportional to the propagation time difference ΔT. In addition, as shown in Equation 5, the flow rate Q of the fluid, which is proportional to the velocity V of the fluid, is proportional to the propagation time difference ΔT. Therefore, if the kind and the temperature of the fluid are known, the flow rate Q of the fluid can be roughly known through the calculation of the propagation time difference ΔT.

Moreover, whether or not the fluid is flowing through the conduit 1 can be determined by estimation from the propagation time difference ΔT. A threshold used for the determination (a first determination threshold) is not particularly limited. As one example, a propagation time difference value that corresponds to a reference flow rate for determining the presence or absence of gas leakage can be used as the threshold.

Specifically, household gas meters in Japan have a safety function in addition to the gas usage measuring function. For the safety function, in order to detect gas leakage, a reference flow rate for determining the presence or absence of minute gas leakage is set to 3 L/h, for example. The reference flow rate for determining the presence or absence of gas leakage is less than the minimum flow rate during the use of the gas. Accordingly, if the flow rate of the fluid is less than the reference flow rate for determining the presence or absence of gas leakage, it means that the gas is currently not in use and there is currently no gas leakage. That is, it can be determined that the gas is not passing through the conduit 1. Therefore, the reference flow rate for determining the presence or absence of gas leakage can be used as a reference for determining the presence or absence of a flow of the fluid (i.e., as the first determination threshold).

For example, assume that there is a relationship in which when the temperature t of the fluid is a room temperature, the propagation time difference ΔT of 1 ns corresponds to the fluid flow rate Q of 1 L/h. In this case, the reference flow rate of 3 L/h for determining the presence or absence of minute gas leakage can be represented as a first determination threshold Ta of 3 ns. Accordingly, if the propagation time difference ΔT has fallen below the first determination threshold Ta of 3 ns, it can be determined that the gas is not currently flowing. Then, the propagation time difference ≠T at the time is used as data for calculating a correction amount (an offset value) Tof of the propagation time difference ΔT.

As described above, the flow rate Q of the fluid can be roughly calculated based on the propagation time difference ΔT. Accordingly, the presence or absence of a flow of the fluid can be determined and the data for calculating the correction amount Tof can be obtained from the propagation time difference ΔT. This makes it possible to reduce the amount of arithmetic operation to perform compared to a case where the presence or absence of a flow of the fluid is determined and the correction amount Tof is obtained from the flow rate Q of the fluid. Therefore, in a case where a battery is used as a power supply for the flow meter device, the flow meter device can be operated for a long term of, for example, ten years while updating the offset value without requiring the replacement of the battery.

(Method of Correcting Flow Rate Q of Fluid)

Figure 3:
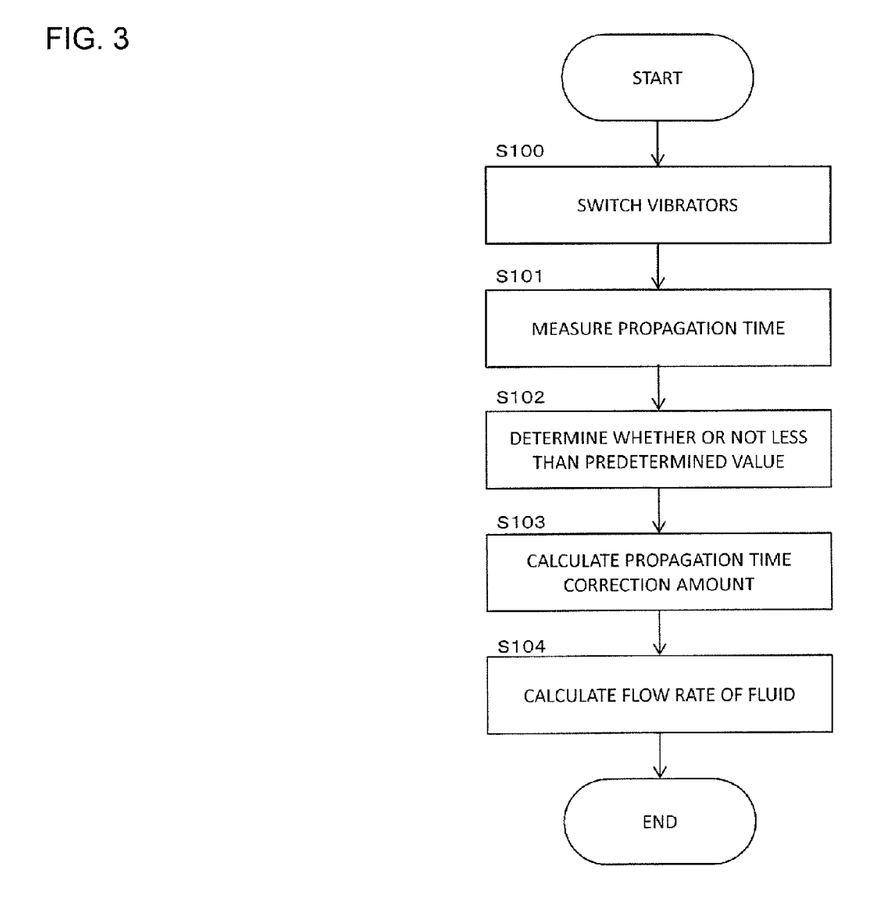
FIG. 3 is a flowchart showing one example of a flow rate calculation method applied to the flow meter device of FIG. 1.

Next, a specific description of a method of correcting the flow rate Q of the fluid is given below. As described above in Operation of Flow Meter Device, the timekeeper 10 measures the propagation times T1 and T2 based on the propagation time Ts in Equation 1. Here, in order to further improve the measurement precision by utilizing averaging, the propagation times T1 and T2 are calculated a plurality of times continuously. FIG. 3 is a flowchart showing one example of a flow rate calculation method applied to the flow meter device.

The switch 9 switches between the first vibrator 2 and the second vibrator 3 such that the vibrators 2 and 3 alternately transmit ultrasonic signals (step S100). For example, the vibrators 2 and 3 alternately transmit ultrasonic signals such that each vibrator performs the transmission of an ultrasonic signal a predetermined number of measurement times, i.e., 30 times, during a measurement period of two seconds. Each time the second vibrator 3 receives the ultrasonic signal, the timekeeper 10 calculates the propagation time T1 in the forward direction, and outputs the propagation time T1 to the accumulator 12. Also, each time the first vibrator 2 receives the ultrasonic signal, the timekeeper 10 calculates the propagation time T2 in the reverse direction, and outputs the propagation time T2 to the accumulator 12 (step S101).

For example, the accumulator 12 sums up the propagation times T1 of the 30 times to calculate an accumulated value Tsum1 of the propagation times T1, and outputs the accumulated value Tsum1 to the time difference calculator 13. Also, for example, the accumulator 12 sums up the propagation times T2 of the 30 times to calculate an accumulated value Tsum2 of the propagation times T2, and outputs the accumulated value Tsum2 to the time difference calculator 13.

The time difference calculator 13 receives the accumulated values Tsum1 and Tsum2 of the propagation times T1 and T2, and calculates an average value (an average propagation time difference) ΔTs of propagation time differences ΔT by using Equation 10 shown below. Here, as mentioned above, Tsum1 is the accumulated value of the propagation times T1 in the forward direction, and Tsum2 is the accumulated value of the propagation times T2 in the reverse direction. N1 is the aforementioned predetermined number of measurement times (i.e., the number of times of accumulating the propagation times at the time of calculating each accumulated value), which is set in the controller 6 in advance. In the present embodiment, N1=30.

$$\Delta Ts = (T\text{sum}2 - T\text{sum}1)/N1 \quad \text{(Equation 10)}$$

The correction amount calculator 14 determines in every measurement period of two seconds whether or not the absolute value of the average propagation time difference ΔTs calculated by the time difference calculator 13 is less than the first determination threshold Ta (e.g., 3 ns) (step S102). As a result of the determination, if the average propagation time difference ΔTs is less than the first determination threshold Ta, it is determined that the fluid is not flowing through the conduit 1. It should be noted that by using the absolute value of the average propagation time difference ΔTs, even a reverse flow due to abnormal piping such as reverse connection can be detected.

In order to increase the reliability of the correction amount Tof, the correction amount calculator 14 further calculates an average value ΔTave of average propagation time differences ΔTs that have been obtained for a predetermined number of times N2 (e.g., ten times). At the time, in order to further improve the reliability of the correction amount Tof, the correction amount calculator 14 determines whether or not a correction condition has been met. The correction condition adopted herein may be, for example, a condition where the average propagation time differences ΔTs inputted from the time difference calculator 13 have been less than the first determination threshold Ta for the predetermined number of times N2, i.e., ten times, in a row. However, the correction condition is not thus limited. For example, instead of or in addition to the above condition, the following condition may be adopted as the correction condition: the difference between the maximum value and the minimum value of the average propagation time differences ΔTs for the predetermined number of times N2, i.e., ten times, is less than or equal to a limiting value.

In order to further improve the reliability of the correction amount Tof, the correction amount calculator 14 further determines whether or not the average value ΔTave of the average propagation time differences ΔTs is less than a second determination threshold Tb. The second determination threshold Tb is set to a value (e.g., 1.2 ns) that is less than the first determination threshold Ta. As a result of the determination, if the average value ΔTave is less than the second determination threshold Tb, the average value ΔTave is set as the correction amount Tof (step S103).

Here, since it has been determined that the fluid is not flowing through the conduit 1, the average propagation time difference ΔTs is supposed to be zero. However, as described above in Operation of Flow Meter Device, the average propagation time difference ΔTs occurs due to the variation in the delay time Ti, the variation being caused by the characteristic differences between the vibrators 2 and 3. Therefore, in order to obtain a more precise propagation time, each of the propagation times T1 and T2 is offset by using the average value ΔTave of the average propagation time differences ΔTs as the correction amount Tof.

The correction amount calculator 14 stores the correction amount Tof in the correction amount memory 15 as the most recent correction amount. The stored correction amount Tof is used in correction calculation by the propagation time corrector 16 until the correction amount is updated next time.

The propagation time corrector 16 obtains the accumulated values Tsum1 and Tsum2 of the propagation times T1 and T2 from the accumulator 12 in every measurement period of two seconds. The propagation time corrector 16 also obtains the correction amount Tof from the correction amount calculator 14 or the correction amount memory 15. Then, the propagation time corrector 16 calculates propagation times Tc1 and Tc2, which are corrected values, by using Equation 11 and Equation 12 shown below.

$$Tc1 = T\text{sum}1/N1 - Ti + Tof/2 \quad \text{(Equation 11)}$$

$$Tc2 = T\text{sum}2/N1 - Ti - Tof/2 \quad \text{(Equation 12)}$$

It should be noted that an average propagation time difference $\Delta Tc$ after the correction, which is calculated by the propagation time corrector 16, is represented by Equation 13 shown below. It is understood from Equation 13 that the average propagation time difference $\Delta Tc$ after the correction is a value that is obtained by correcting, with the correction amount Tof, the average propagation time difference $\Delta Ts$ calculated by the time difference calculator 13.

$$\Delta Tc = Tc2 - Tc1 = (T\text{sum}2 - T\text{sum}1)/N1 - Tof = \Delta Ts - Tof \quad \text{(Equation 13)}$$

The flow rate calculator 17 calculates a corrected flow rate Q of the fluid from Equation 14 shown below by using the corrected propagation times Tc1 and Tc2 calculated by the propagation time corrector 16 (step S104).

$$Q = S \cdot L/2 \cos\theta \cdot (1/Tc1 - 1/Tc2) \quad \text{(Equation 14)}$$

According to the above configuration, if the average propagation time differences $\Delta Ts$ are each less than the first threshold value Ta, the arithmetic operation block 200 uses the average value $\Delta Tave$ of the average propagation time differences $\Delta Ts$ as the correction amount Tof of the propagation time, and corrects the flow rate Q of the fluid based on the correction amount Tof. In this manner, without requiring the use of a particular mechanism for stopping the flow of the fluid in the conduit 1, the correction amount Tof for correcting the flow rate Q of the fluid can be updated. This consequently makes it possible to suppress a decrease in measurement precision for a long term without causing inconvenience.

Moreover, the average propagation time differences $\Delta Ts$ each less than the first threshold value Ta are measured for the predetermined number of times N2, and the average value $\Delta Tave$ of the average propagation time differences $\Delta Ts$ is used as the correction amount Tof of the propagation time. In this manner, the correction precision can be improved. Specifically, since the above-described configuration does not include a mechanism for stopping the flow of the fluid in the conduit 1, it cannot be known for sure that the flow of gas is completely stopped. For example, it is conceivable that a local pressure difference in the conduit 1 causes a minute flow of the fluid. Considering such a case, improvement in the precision can be more expected when the average value $\Delta Tave$, which is obtained from a long period of measurement, is used as the correction amount Tof, rather than when the average propagation time difference $\Delta Ts$, which is obtained from a short period of measurement, is used as the correction amount Tof.

Furthermore, the correction amount Tof in the correction amount memory 15 is sequentially updated each time the correction amount Tof is obtained from the average value $\Delta Tave$. As a result, most recent information in which the current situation is reflected as much as possible can be used as the correction amount Tof. This consequently makes it possible to suitably correct the flow rate Q of the fluid in accordance with the current situation.

In the above description, the predetermined number of times N2, which is used for calculating the average value $\Delta Tave$ of the average propagation time differences $\Delta Ts$, is ten times. However, the predetermined number of times N2 is not limited to ten times. As the predetermined number of times N2 increases, more average propagation time differences $\Delta Ts$ are averaged, which makes it possible to increase the precision of the correction amount Tof obtained from the average value $\Delta Tave$ of the average propagation time differences $\Delta Ts$.

In the above description, the first determination threshold Ta, the correction condition, and the second determination threshold Tb are the requirements to meet at the time of calculating the correction amount Tof. However, such requirements may be suitably set in accordance with the required measurement precision of the flow meter device.

(Embodiment 2)
(Configuration of Flow Meter Device)

Figure 4:
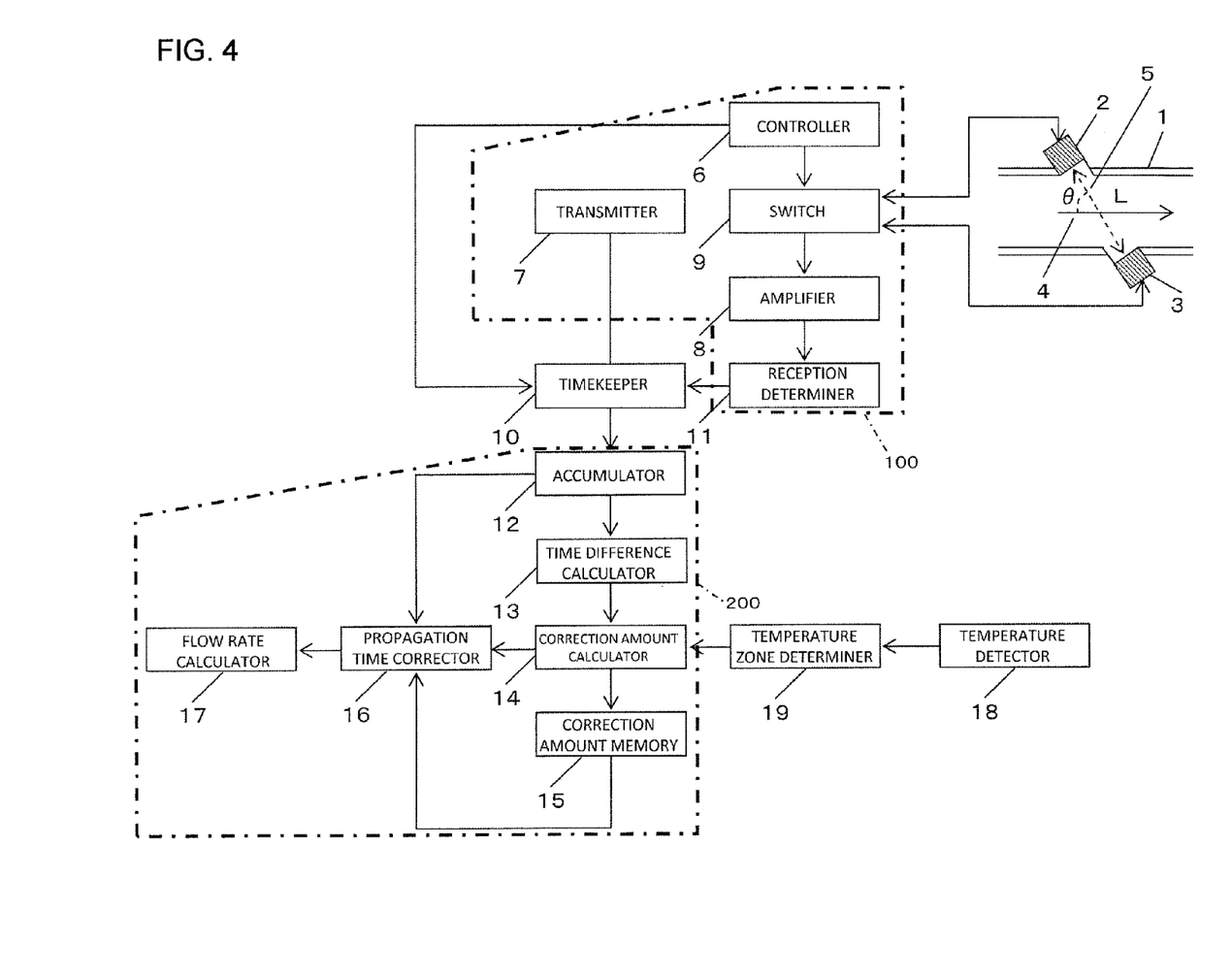
FIG. 4 is a functional block diagram showing the configuration of a flow meter device according to Embodiment 2 of the present invention.
Figure 5:
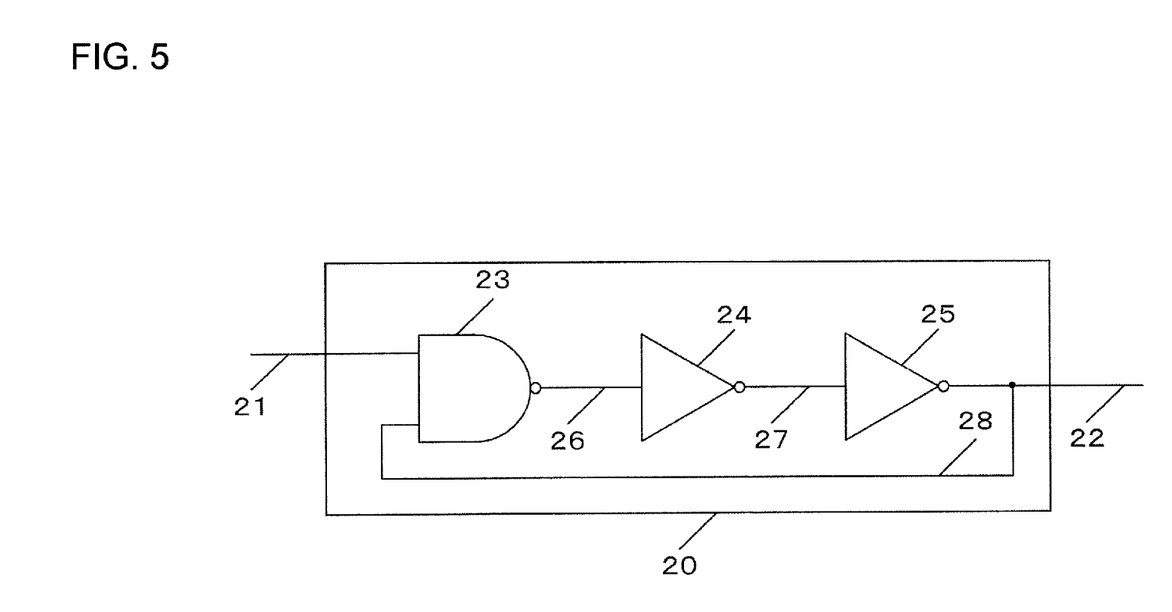
FIG. 5 is a block diagram showing the configuration of a temperature detector in the flow meter device of FIG. 2.

FIG. 4 is a configuration diagram showing a flow meter device according to Embodiment 2. FIG. 5 is a functional block diagram showing the configuration of a ring oscillator 20. As shown in FIG. 4, the flow meter device according to Embodiment 2 further includes a temperature detector 18 and a temperature zone determiner 19 in addition to the components included in the flow meter device according to Embodiment 1. In the flow meter device according to Embodiment 2, the timekeeper 10 includes the ring oscillator 20 (FIG. 5).

The temperature detector 18 is a sensor detecting the temperature t of the fluid passing through the conduit 1. It should be noted that, alternatively, the temperature detector 18 can detect the temperature of the conduit 1 or the ambient temperature of the conduit 1 as the temperature t of the fluid in the conduit 1. A semiconductor element whose characteristics change in accordance with a temperature is used as the temperature detector 18. Specific examples of the semiconductor element include the ring oscillator 20 (FIG. 5). That is, although the timekeeper 10 and the temperature detector 18 are shown in FIG. 4 as being independent of each other, the ring oscillator 20 included in the timekeeper 10 may be used to configure the temperature detector 18.

The temperature zone determiner 19 stores temperature zone information. Based on the temperature zone information, the temperature zone determiner 19 determines to which temperature zone the temperature detected by the temperature detector 18 belongs. For example, the temperature zone information contains temperature zones that are obtained by dividing up a temperature range every 10° C. Specifically, the temperature zone information contains: a zone of −40° C., which is a temperature zone corresponding to detected temperatures of −30° C. and lower; a zone of −30° C., which is a temperature zone corresponding to detected temperatures of −30° C. to −20° C.; a zone of −20° C., which is a temperature zone corresponding to detected temperatures of −20° C. to −10° C.; a zone of −10° C., which is a temperature zone corresponding to detected temperatures of −10° C. to 0° C.; a zone of 0° C., which is a temperature zone corresponding to detected temperatures of 0° C. to 10° C.; a zone of 10° C., which is a temperature zone corresponding to detected temperatures of 10° C. to 20° C.; a zone of 20° C., which is a temperature zone corresponding to detected temperatures of 20° C. to 30° C.; a zone of 30° C., which is a temperature zone corresponding to detected temperatures of 30° C. to 40° C.; a zone of 40° C., which is a temperature zone corresponding to detected temperatures of 40° C. to 50° C.; a zone of 50° C., which is a temperature zone corresponding to detected temperatures of 50° C. to 60° C.; and a zone of 60° C., which is a temperature zone corresponding to detected temperatures of 60° C. and higher.

The correction amount calculator 14 calculates the correction amount Tof based on the average propagation time differences $\Delta Ts$ calculated by the time difference calculator 13. The correction amount Tof is stored in the correction amount memory 15 as the most recent correction amount. At the time, the correction amount calculator 14 updates the correction amount Tof in the correction amount memory 15 for a corresponding temperature zone.

Specifically, when the correction amount calculator 14 has calculated the correction amount Tof, the correction amount calculator 14 stores the correction amount Tof in the correction amount memory 15 for the temperature zone determined by the temperature zone determiner 19. That is, the correction amount Tof, and the temperature zone to which the temperature detected at the time of calculating the correction amount Tof belongs, are stored in association with each other. When the correction amount calculator 14 stores a new correction amount Tof in the correction amount memory 15, if a previous correction amount Tof has already been stored in the correction amount memory 15, then the correction amount calculator 14 stores the new correction amount Tof in the correction amount memory 15 as the most recent correction amount in place of the previous correction amount Tof.

The propagation time corrector 16 calculates corrected propagation times Tc1 and Tc2 based on accumulated values Tsum1 and Tsum2 from the accumulator 12 and the correction amount Tof from the correction amount calculator 14 or the correction amount memory 15. At the time, the propagation time corrector 16 obtains, from the correction amount calculator 14 or the correction amount memory 15, the correction amount Tof associated with the temperature zone that corresponds to the detected temperature from the temperature detector 18. Here, there is a case where the correction amount Tof has not yet been calculated in association with the temperature zone that corresponds to the detected temperature. In this case, the propagation time corrector 16 obtains, from the correction amount memory 15, the correction amount Tof associated with the temperature zone that does not corresponds to but is close to the detected temperature, and then calculates the corrected propagation times Tc1 and Tc2.

The flow rate calculator 17 calculates the flow rate Q of the fluid from Equation 14 by using the corrected propagation times Tc1 and Tc2 calculated by the propagation time corrector 16.

According to the above configuration, correction amounts Tof are calculated for respective temperature zones. Accordingly, even though the correction amount (offset value) of the propagation time of the ultrasonic signal changes in accordance with the temperature t of the fluid, the flow rate Q of the fluid can be obtained by using the propagation time that has been corrected in accordance with the change. This makes it possible to further improve the precision of the flow meter device.

(Configuration of Ring Oscillator)

As shown in FIG. 5, the ring oscillator 20 is an oscillating circuit, which is connected to an enable terminal 21 and an output terminal 22. The ring oscillator 20 includes three logic elements, which are a NAND gate 23, an inverter 24, and an inverter 25. The enable terminal 21 is connected to one of the inputs of the NAND gate 23, and the output terminal 22 is connected to the output of the inverter 25.

The output of the NAND gate 23 and the input of the inverter 24 are connected by a data line 26 by cascade connection, and the output of the inverter 24 and the input of the inverter 25 are connected by a data line 27 by cascade connection. The output of the inverter 25 branches into the output terminal 22 and a data line 28. The data line 28 is connected to the other input of the NAND gate 23. It should be noted that the number of logic elements is required to be an odd number, including one NAND gate and a plurality of inverters. Therefore, the number of logic elements is not limited to three shown in FIG. 5.

When the logic level of the enable terminal 21 is L (Low), the logic level of the data line 26 is fixed to H (High). Accordingly, the logic level of the data line 27 is fixed to L; the logic level of the data line 28 is fixed to H; and the logic level of the output terminal 22 is fixed to H.

Next, when the logic level of the enable terminal 21 is switched to H, the logic level of the data line 26 is inverted from H to L after a slight delay time. Accordingly, the logic level of the data line 27 is inverted to H after a slight delay time, and the logic level of the data line 28 is inverted to L after a slight delay time. As a result, the logic level of the output terminal 22 is inverted from H to L.

When the logic level of the data line 28 is inverted to L, the logic level of the data line 26 is inverted to H again owing to the function of the NAND gate 23 after a slight delay time. In accordance with the inversion, the logic level of each of the data line 27, the data line 28, and the output terminal 22 is inverted.

In this manner, when the logic level of the enable terminal 21 is H, the logic level of the output terminal 22 is inverted periodically and continuously. Accordingly, the ring oscillator 20 acts as an oscillating circuit. If the sum of the delay times that occur when data inversion occurs in the three logic elements 23, 24, and 25 of the ring oscillator 20 is Td, then the oscillation period of the ring oscillator 20 is 2Td.

The delay times in the logic elements 23, 24, and 25 change proportionally to a temperature. Accordingly, by obtaining a relationship between the temperature and the oscillation period of the ring oscillator 20 in advance, the ring oscillator 20 can be used as the temperature detector 18. It should be noted that there is a known configuration that includes the ring oscillator 20 as described above as timekeeping means. Therefore, a configuration including the ring oscillator 20 as the timekeeper 10 is adoptable.

According to the above-described configuration, the ring oscillator 20 included in the timekeeper 10 is used as the temperature detector 18. This eliminates the necessity to install the temperature detector 18 separately, and makes it possible to suppress an increase in the cost and size of the flow meter device.

(Embodiment 3)

In Embodiment 2, the flow rate Q of the fluid is calculated by using the correction amount Tof, which is calculated by the correction amount calculator 14 for each temperature zone. On the other hand, in Embodiment 3, the correction amount Tof is calculated based on conditions that are changed in accordance with the temperature t of the fluid, and the flow rate Q of the fluid is calculated by using the correction amount Tof.

Figure 6:
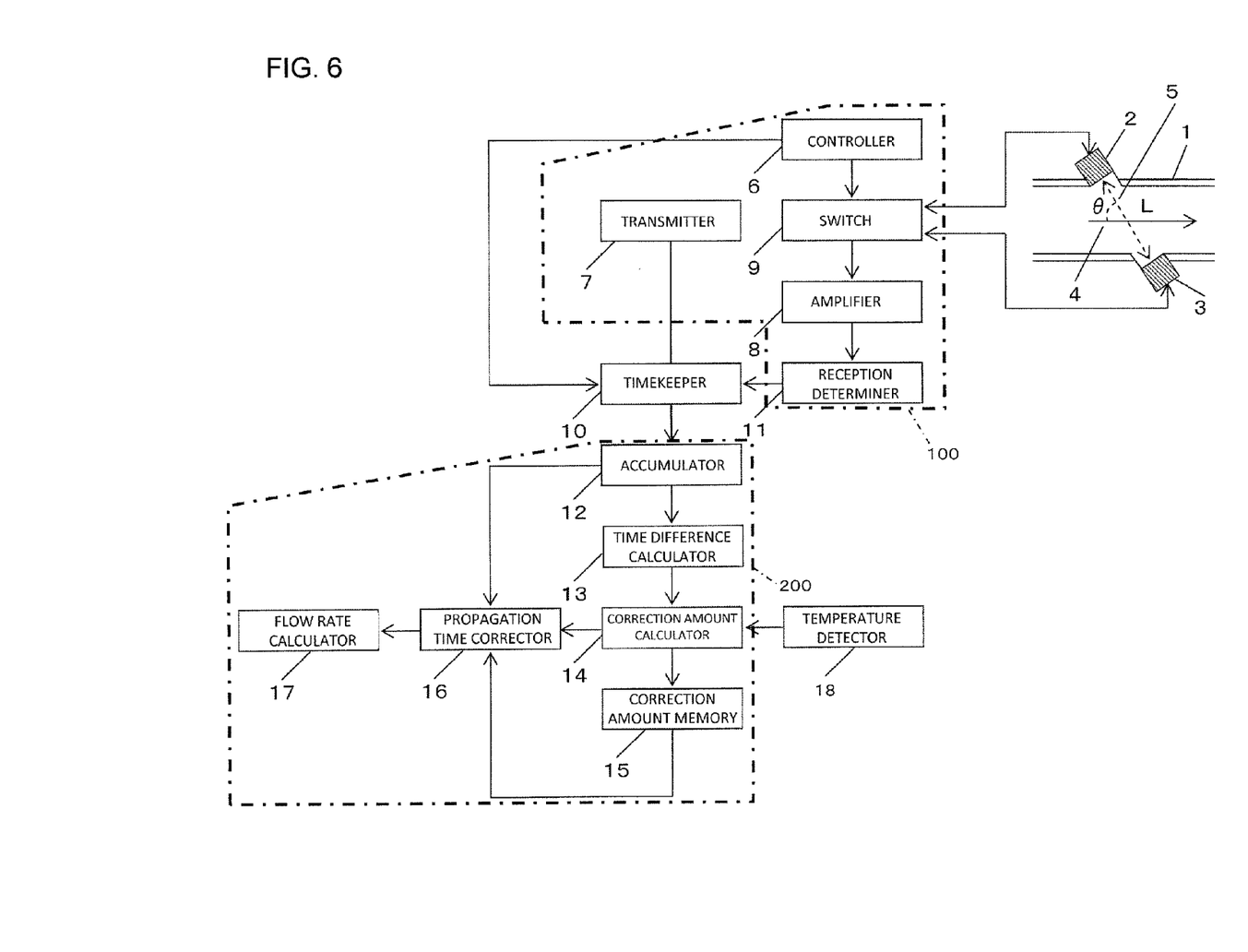
FIG. 6 is a functional block diagram showing the configuration of each of flow meter devices according to Embodiments 3 and 4 of the present invention.

FIG. 6 is a functional block diagram showing the configuration of a flow meter device according to Embodiment 3. As shown in FIG. 6, the flow meter device according to Embodiment 3 further includes the temperature detector 18 in addition to the components included in the flow meter device according to Embodiment 1. The temperature detector 18 according to Embodiment 3 is the same as the temperature detector 18 according to Embodiment 2.

It is understood from Equation 4, Equation 5, and Equation 8 that the flow rate Q is proportional to each of the propagation time difference ΔT and the square of the speed of sound C. It is understood from Equation 9 that the speed of sound C is represented by a linear expression of the temperature t of the fluid. Consequently, the flow rate Q of the fluid is proportional to each of the square of the temperature t of the fluid and the propagation time difference ΔT. Therefore, assuming that the flow rate Q is the same, the higher the temperature t of the fluid, the less the propagation time difference ΔT. Accordingly, settings are made such that the higher the temperature t of the fluid, the less the determination thresholds Ta and Tb. For example, such determination thresholds Ta and Tb changing in accordance with the temperature t may be set for each temperature zone described in Embodiment 2.

According to the above configuration, the determination thresholds Ta and Tb for obtaining the correction amount Tof are changed in accordance with the temperature t of the fluid. Consequently, variation in the propagation time difference $\Delta T$ due to changes in the temperature t of the fluid can be eliminated, which makes it possible to suppress a decrease in the precision of the correction amount Tof.

(Embodiment 4)

In Embodiment 4, the correction amount Tof is calculated based on conditions that are changed in accordance with the temperature t of the fluid, and the flow rate Q of the fluid is calculated by using the correction amount Tof. It should be noted that a flow meter device according to Embodiment 4 is represented by a functional block diagram that is the same as the functional block diagram shown in FIG. 6 and previously described in Embodiment 3. That is, as shown in FIG. 6, the flow meter device according to Embodiment 4 further includes the temperature detector 18 in addition to the components included in the flow meter device according to Embodiment 1.

As previously described in Embodiment 3, the flow rate Q of the fluid is proportional to the square of the temperature t of the fluid and the propagation time difference $\Delta T$. Therefore, assuming that the flow rate Q is the same, the higher the temperature t of the fluid, the less the propagation time difference $\Delta T$. Accordingly, in accordance with an increase in the temperature t of the fluid, the difficulty in the measurement of the propagation time difference $\Delta T$ increases, causing an increase in variation in the propagation time difference $\Delta T$. In view of this, the predetermined numbers of times N1 and N2 used for calculating the average value $\Delta T$ave of the propagation time differences $\Delta T$ are changed in accordance with the temperature t of the fluid.

For example, the predetermined numbers of times N1 and N2 are increased in accordance with an increase in the temperature t of the fluid, and the predetermined numbers of times N1 and N2 are decreased in accordance with a decrease in the temperature t of the fluid. It should be noted that in the case of changing the predetermined numbers of times N1 and N2, the predetermined number of times N1 and/or the predetermined number of times N2 are changed.

In the case of decreasing the predetermined number of times N1, the predetermined number of times N1 may be set to 1. In this case, after calculating the propagation time difference $\Delta T$, the correction amount calculator 14 may set the propagation time difference $\Delta T$ as the correction amount Tof without calculating the average value $\Delta T$ave. Moreover, the predetermined numbers of times N1 and N2 may be set to 0. In this case, the propagation time difference $\Delta T$ is not corrected.

The predetermined numbers of times N1 and N2 used for calculating the average value $\Delta T$ave may be set, in advance, in association with each temperature zone described in Embodiment 2. In this case, at the time of calculating the correction amount Tof, the temperature t of the fluid at the time is obtained. Then, the average value $\Delta T$ave is calculated by using the predetermined numbers of times N1 and N2 that are set in association with the temperature zone to which the temperature t belongs.

According to the above-described configuration, the predetermined numbers of times used for calculating the correction amount Tof are changed in accordance with the temperature t of the fluid. Consequently, variation in the propagation time difference $\Delta T$ due to changes in the temperature t of the fluid can be eliminated, which makes it possible to suppress a decrease in the precision of the correction amount Tof.

INDUSTRIAL APPLICABILITY

As described above, the flow meter device and the flow rate calculation method thereof according to the present invention are capable of correcting the flow rate value without interrupting the use of gas, thereby making it possible to perform precise flow rate measurement for a long term without causing inconvenience. Therefore, the flow meter device and the flow rate calculation method thereof according to the present invention are applicable to a wide range of applications from household gas meters to professional-use large-sized gas meters. The flow meter device and the flow rate calculation method thereof according to the present invention are also applicable to liquid flowmeters such as water meters.

What is claimed is:

1. A flow meter device for measuring a flow rate of a fluid passing through a conduit, the flow meter device comprising:
   a first vibrator and a second vibrator, each of which is provided on the conduit and configured to transmit and receive an ultrasonic signal;
   a control unit configured to intermittently switch transmitting and receiving vibrators of the ultrasonic signal between the first vibrator and the second vibrator;
   a timekeeper configured to measure a propagation time of the ultrasonic signal in a forward direction from the first vibrator to the second vibrator, and measure a propagation time of the ultrasonic signal in a reverse direction from the second vibrator to the first vibrator; and
   an arithmetic operation unit configured to calculate the flow rate of the fluid based on the propagation times of the ultrasonic signal, wherein
   the arithmetic operation unit is configured to:
      determine whether or not a time difference between the propagation time in the forward direction and the propagation time in the reverse direction is less than a predetermined value indicative of a determination threshold value;
      calculate a propagation time correction amount based on the time difference if it is determined that the time difference is less than the predetermined value; and
      calculate the flow rate of the fluid by using the propagation time correction amount.

2. The flow meter device according to claim 1, further comprising:
   a temperature detector configured to detect a temperature of the fluid; and
   a temperature zone determiner configured to determine, among predetermined temperature zones, a temperature zone to which the temperature of the fluid belongs, wherein
   the arithmetic operation unit is configured to calculate the propagation time correction amount for each of the temperature zones.

3. The flow meter device according to claim 2, wherein conditions for calculating the propagation time correction amount are different for each temperature zone.

4. A flow rate calculation method of a flow meter device, the flow meter device including a first vibrator and a second vibrator, each of which is provided on a conduit and configured to transmit and receive an ultrasonic signal, the flow meter device measuring a flow rate of a fluid flowing through the conduit, the flow rate calculation method comprising:
- intermittently switching transmitting and receiving vibrators of the ultrasonic signal between the first vibrator and the second vibrator;
- measuring a propagation time of the ultrasonic signal in a forward direction from the first vibrator to the second vibrator and a propagation time of the ultrasonic signal in a reverse direction from the second vibrator to the first vibrator;
- determining whether or not a time difference between the propagation time in the forward direction and the propagation time in the reverse direction is less than a predetermined value indicative of a determination threshold value;
- calculating a propagation time correction amount based on the time difference if it is determined that the time difference is less than the predetermined value; and
- calculating the flow rate of the fluid by using the propagation time correction amount.

* * * * *